C. KINGSLAND, dec'd.,

E. J. KINGSLAND, administratrix, T. C. PERRINE, assignor, by mesne assignment.

Method of Constructing Car Wheel.

No. 9,619. Reissued March 22, 1881.

Witnesses.
L. Bacon
C. H. Berry

Inventor.
Thomas C. Perrine
Assignee
by his Attorneys
Bakewell & Kerr

N. PETERS, PHOTO-LITHOGRAPHER, WASHINGTON, D. C.

UNITED STATES PATENT OFFICE.

THOMAS C. PERRINE, OF MANSFIELD, PENNSYLVANIA, ASSIGNEE, BY MESNE ASSIGNMENTS, OF CORNELIUS KINGSLAND AND ELIZA J. KINGSLAND, ADMINISTRATRIX OF SAID CORNELIUS KINGSLAND, DECEASED.

METHOD OF CONSTRUCTING CAR-WHEELS.

SPECIFICATION forming part of Reissued Letters Patent No. 9,619, dated March 22, 1881.

Original No. 72,405, dated December 17, 1867. Application for reissue filed February 23, 1881.

*To all whom it may concern:*

Be it known that CORNELIUS KINGSLAND, deceased, late of McKeesport, in the county of Allegheny, State of Pennsylvania, invented a new and useful Method of Constructing Car-Wheels; and I do hereby declare that the following is a full, clear, and exact description of the same, reference being had to the accompanying drawings by letters of reference marked thereon.

In casting car-wheels in "chills," for the purpose of hardening the tread of the wheel, the periphery of the wheel cools first, and in cooling contracts. The effect of the chill is to render the periphery more dense and brittle, so that the whole wheel cools on a strain, and is liable to crack. In addition to this the chill makes the outer part of the flange scant and imperfect.

The invention of CORNELIUS KINGSLAND consists, first, in casting the wheel upon a chill having a number of cores extending laterally to form lateral recesses in the tread of the wheel, and, after the wheel is cast, filling said recesses with a suitable metallic filling; second, in casting the outer part of the flange of a car-wheel upon the sand while the tread is cast upon the chill; third, in a chill adapted for these purposes; and, fourth, a car-wheel produced thereby.

To enable others skilled in the art to make and use this invention, it will now be described by reference to the accompanying drawings, in which—

Figure 1:
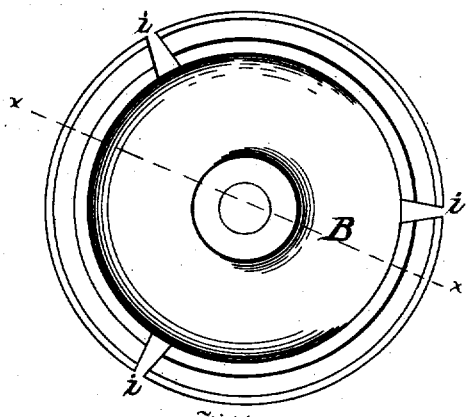
Figure 2:
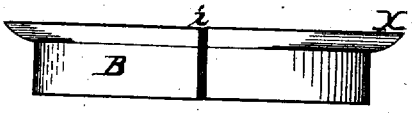
Figure 3:
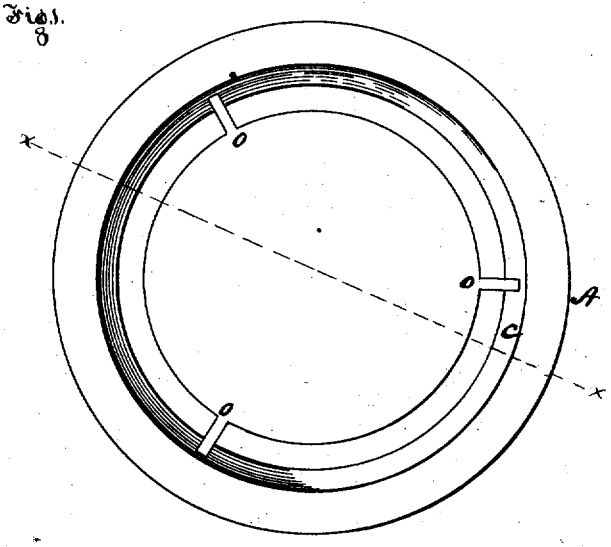
Figure 4:
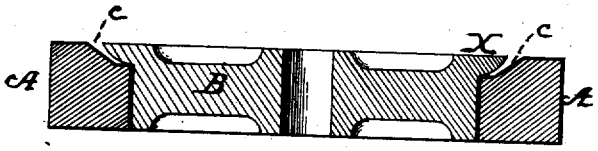

Figure 1 is a side view of the wheel. Fig. 2 is an edge view of the same. Fig. 3 is a top view of the chill, and Fig. 4 is a transverse section of the car-wheel and chill on the line *x x* of Figs. 1 and 3.

The chill A and wheel B are of any of the known forms; but a portion of the chill A, under the flange X of the wheel, is cut away or recessed, as at *c*, so that in molding and casting the wheel the outer part of the flange X will rest upon the sand. This limits the effect of the chill, and will cause the flange of the wheel to have a full and perfect edge.

The chill is provided with a number of lateral recesses, *o*, on its inner face, in which are placed cores, which form lateral dovetail recesses *i* in the edge of the wheel B. These recesses are filled with suitable pieces of steel, which are provided with teeth similar to the teeth of a file, and are made hard and then driven into the dovetail recesses. The recesses may also be filled with hard metal melted and poured into them until the metals become welded together. This part of the invention is not limited to these two methods of filling the recesses, nor to any particular number and form of recesses.

The advantages of this invention consist in relieving the wheel from undue strain in cooling after being cast, and from undue strain caused by change of temperature or by the action of the wheels on the rails; also, in the ability to cast and cool off the wheels safely without the use of cooling-pits; also, in the increased strength and durability of the wheels, and in saving of stock in casting.

What I claim as the invention of the said CORNELIUS KINGSLAND is—

1. The method of making car-wheels which consists in casting the wheel in a chill having inwardly-projecting cores to form lateral recesses in the tread, and then filling said recesses with a suitable metallic filling, substantially as and for the purposes set forth.

2. The method of making car-wheels which consists of casting the tread against a metallic chill and the outer part of the flange upon sand, substantially as and for the purposes set forth.

3. A car-wheel chill having lateral recesses in its inner face for containing inwardly-projecting cores for forming corresponding recesses in the tread of the wheel, substantially as and for the purposes set forth.

4. A car-wheel chill having the portion which comes under the outer part of the flange of the wheel recessed or cut away, so that in molding and casting the outer part of the flange shall rest upon the sand, substantially as and for the purposes set forth.

5. A cast-iron car-wheel having a chilled tread and the outer part of the flange unchilled, substantially as and for the purposes set forth.

In testimony whereof I have hereunto set my hand.

THOMAS C. PERRINE,
*Assignee.*

Witnesses:
C. L. PARKER,
T. B. KERR,
J. A. MCKEAN.